(12) United States Patent
Weiss et al.

(10) Patent No.: US 6,313,734 B1
(45) Date of Patent: *Nov. 6, 2001

(54) VOICE SYNTHESIS OF E-MAIL FOR DELIVERY TO VOICE PAGER OR VOICE MAIL

(75) Inventors: Louis H. Weiss, New York, NY (US); Michael S. Lang, Ridgewood, NJ (US)

(73) Assignees: Sony Corporation, Tokyo (JP); Sony Electronics, Inc., Park Ridge, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/675,011

(22) Filed: Jul. 3, 1996

(51) Int. Cl.$^7$ ........................................ H04Q 7/14
(52) U.S. Cl. .................... 340/7.29; 340/7.57; 379/88.15; 379/88.16
(58) Field of Search ............................ 340/825.44, 311.1, 340/7.28, 7.29, 7.57; 379/67, 88, 88.12–88.16; 455/31.3, 413, 89, 11.1; 709/206

(56) References Cited

U.S. PATENT DOCUMENTS

| | | | |
|---|---|---|---|
| 3,699,443 | * 10/1972 | Weger | 455/11.1 |
| 4,499,567 | * 2/1985 | Armstrong | 340/825.44 X |
| 4,606,073 | * 8/1986 | Moore | 455/89 |
| 4,962,377 | * 10/1990 | Wallace et al. | 340/825.44 |
| 5,418,835 | * 5/1995 | Froham et al. | 455/413 |
| 5,475,738 | * 12/1995 | Penzias | 379/67 |
| 5,479,408 | * 12/1995 | Will | 340/825.44 |
| 5,600,703 | * 2/1997 | Dang et al. | 455/31.3 |
| 5,706,211 | * 1/1998 | Beletic | 709/206 |
| 5,712,901 | * 1/1998 | Meermans | 37/98 |

* cited by examiner

Primary Examiner—Edwin C. Holloway, III
(74) Attorney, Agent, or Firm—Jay H. Maioli

(57) ABSTRACT

A voice paging system includes a computer for receiving an electronically transmitted text message and controlling the voice paging system, a text-to-voice converter for converting the text message to a voiced message, a transmitter for transmitting the voiced message in a wireless manner, and a voice pager unit for receiving the transmitted voiced message and broadcasting the voiced message.

6 Claims, 4 Drawing Sheets

VOICE SYNTHESIS OF E-MAIL FOR DELIVERY TO VOICE PAGER OR VOICE MAIL

BACKGROUND

The present invention relates generally to wireless communication and voice paging. More particularly, the present invention relates to a voice paging system that electronically converts a typed message to a voiced message and delivers the voiced message to a voice pager unit or voice mail recorder.

Presently, a person who is travelling or at a remote location can be paged or contacted by wearing a small beeper unit that notifies the person when someone is trying to reach him or her. Usually, a caller will call the person's beeper number using a telephone, and the paging center associated with that beeper number will send a signal to the beeper unit to alert the person of the call and to display the caller's telephone number to identify the caller. Some beeper units may also display a short message such as, for example, "urgent" or "meeting postponed."

A person can also carry a cellular telephone if he/she wants to remain in contact with others while travelling or at a remote location. However, a cellular phone generally requires the person to respond to an incoming call or lose it. Therefore, if the person does not want to be disturbed and turns the cellular phone's ringer off, incoming calls may be lost. Although some cellular phones can indicate the number of calls the person received while the ringer was turned off, most cellular phones that are currently available are not equipped to identify the callers' telephone numbers or to display short messages from those callers, and therefore those calls will be lost.

In many situations, communication by electronic mail (e-mail) is preferred over communication by telephone. E-mail allows a person to send and receive mail at his or her convenience, and e-mail is not limited to short messages but can include detailed, lengthy messages. Recently, some paging systems have begun to integrate e-mail messages with standard paging operations by providing for limited transmission of e-mail messages to a pager unit. Such e-mail is usually limited in the number of characters that can be transmitted per paging operation, and lengthy messages that exceed the limit may be indiscriminately truncated.

Voice paging systems will soon allow transmission of voiced messages to a voice pager unit, which is a unit for receiving voiced messages that is analogous to a beeper unit for receiving text messages. However, these voice paging systems will likely require recording of the caller's voiced message, similar to leaving a message on a telephone answering machine, or may even require an operator at the voice paging center to read a text message such as an e-mail message into a voice mail recorder for later transmission to the voice pager unit.

OBJECTS AND SUMMARY OF THE INVENTION

It is an object of the present invention to provide a voice paging system that automatically converts a typed message such as an e-mail message to a voiced message and transmits the voiced message to a voice pager unit in a wireless manner and/or delivers the voiced message to a voice mail recorder.

According to an aspect of the present invention, a text message is forwarded by the message sender directly to a voice paging center along with destination information such as the paging address of the voice pager unit of the message receiver. The voice paging center utilizes a text-to-voice converter to automatically convert the text message to a voiced message. The voice paging center then notifies the message receiver of an incoming message and transmits the message to the voice pager unit in a wireless manner and/or delivers the message to a voice mail recorder for later retrieval by the message receiver.

According to another aspect of the present invention, a person can set up his or her e-mail directory to automatically forward a copy of an incoming e-mail message to a text-to-voice converter to convert the e-mail message to a voiced message and store the voiced message in a voice mail recorder for later retrieval.

According to yet another aspect of the present invention, a person can set up his or her e-mail directory to automatically forward a copy of an incoming e-mail message to a voice paging center. The voice paging center uses a text-to-voice converter to convert the e-mail message to a voiced message and notifies the person of the voiced message. The voice paging center then transmits the voiced message to the person's voice pager unit in a wireless manner and/or delivers the voiced message to a voice mail recorder for later retrieval.

The voice paging system of the present invention includes a computer for receiving an electronically transmitted text message and for controlling the voice paging system, a text-to-voice converter for converting the text message to a voiced message, a transmitter for transmitting the voiced message in a wireless manner, and a voice pager unit for receiving the transmitted voiced message and for broadcasting the voiced message.

DETAILED DESCRIPTION OF PREFERRED EMBODIMENTS

Figure 1:
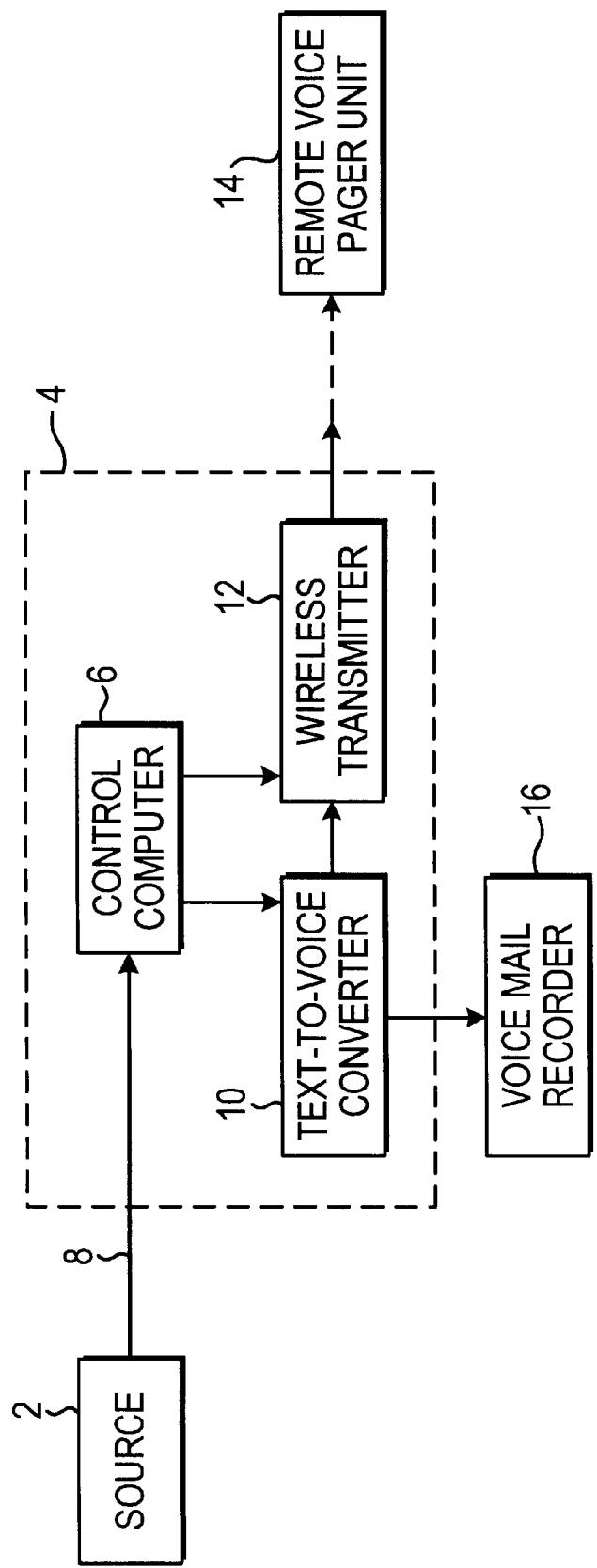
FIG. 1 shows a schematic of a voice paging system according to the present invention.

Preferred embodiments of the voice paging system according to the present invention are described below with reference to the accompanying drawings, in which like reference numerals represent the same or similar elements.

FIG. 1 shows a voice paging system according to the present invention. A text message is electronically transmitted from a source computer 2 to a voice paging system 4 of a voice paging service center via a computer-grade communication network 8. The text message can be transmitted via an external network, such as the Internet, or via a local area network (LAN). A control computer 6 of the voice paging system 4 receives the text message and delivers the text message to a text-to-voice converter 10 for conversion to a voiced message. The text-to-voice converter 10 may comprise a speech synthesizer of the known kind. The extent of the vocabulary of the synthesizer will be determined by the requirements of the system. It will be noted that going from text to synthesized speech requires much less computing power than going from speech to text.

The voiced message from the text-to-voice converter 10 is then fed to a voice mail recorder 16 and to a wireless transmitter 12. The control computer 6 controls the wireless transmitter 12 to transmit in a wireless manner an alerting signal to a voice pager unit 14 indicating to a user of the voice pager unit 14 that a voiced message is about to be transmitted and broadcast by the voice pager unit 14. If the user chooses not to listen to the broadcast message at that time, the voiced message can be retrieved from the voice mail recorder 16 at the user's convenience by, for example, calling the voice mail recorder 16 and retrieving the message in a similar manner as in retrieving messages from a telephone answering machine. Alternatively, the voiced message can be delivered only to the voice mail recorder 16. The control computer 6 controls the wireless transmitter 12 to transmit in a wireless manner an alerting signal to a voice pager unit 14 indicating to a user of the voice pager unit 14 that a voiced message has been recorded by the voice mail recorder 16 and is ready for retrieval.

Figure 2:
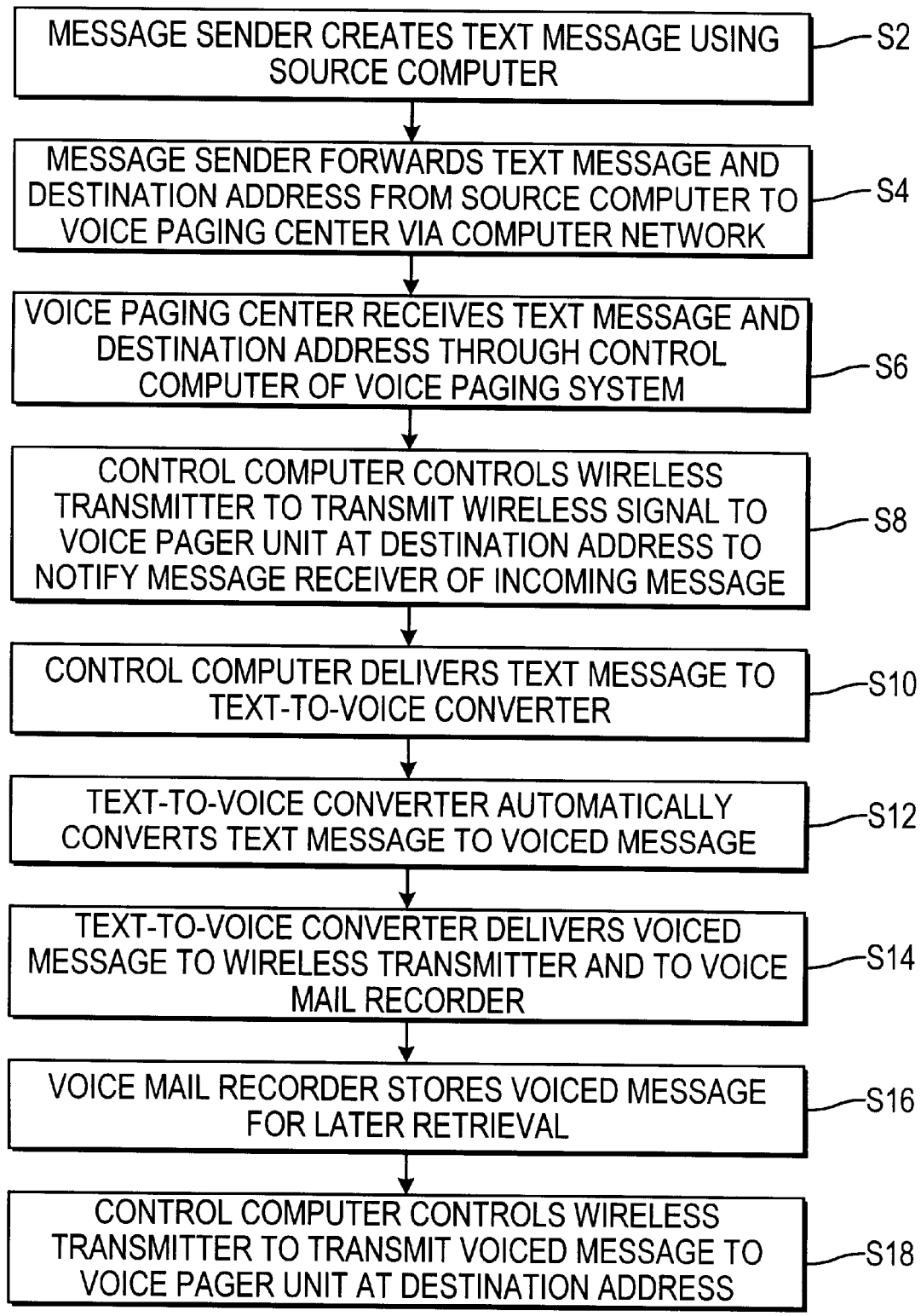
FIG. 2 shows a flow chart of a voice paging operation according to a first embodiment of the present invention.

According to a first embodiment of the present invention, represented by the flow chart of FIG. 2 and relating to the system of FIG. 1, at step S2 a message sender creates a text message such as an e-mail message on a source computer 2. The message sender electronically forwards the text message and a destination address for the text message at step S4 to a voice paging center via a computer network 8. The destination address can include a voice pager unit address and a voice mail recorder address of the message receiver. A voice paging system 4 of the voice paging center receives the text message and the destination address from the computer network 8 at step S6 through a control computer 6 of the voice paging system 4. The control computer 6 then controls a wireless transmitter 12 at step S8 to transmit in a wireless manner a signal to the voice pager unit 14 at the destination address to notify the message receiver of an incoming message. The control computer 6 at step S10 also delivers the text message to a text-to-voice converter 10 of the voice paging system 4. The text-to-voice converter 10 automatically converts the text message to a voiced message at step S12 and delivers the voiced message at step S14 to the wireless transmitter 12 and to a voice mail recorder 16 at the voice mail recorder address. The voice mail recorder 16 stores the voiced message at step S16 for later retrieval by the message receiver. The control computer 6 then at step S18 controls the wireless transmitter 12 to transmit in a wireless manner the voiced message to the voice pager unit 14 at the voice pager unit address.

Figure 3:
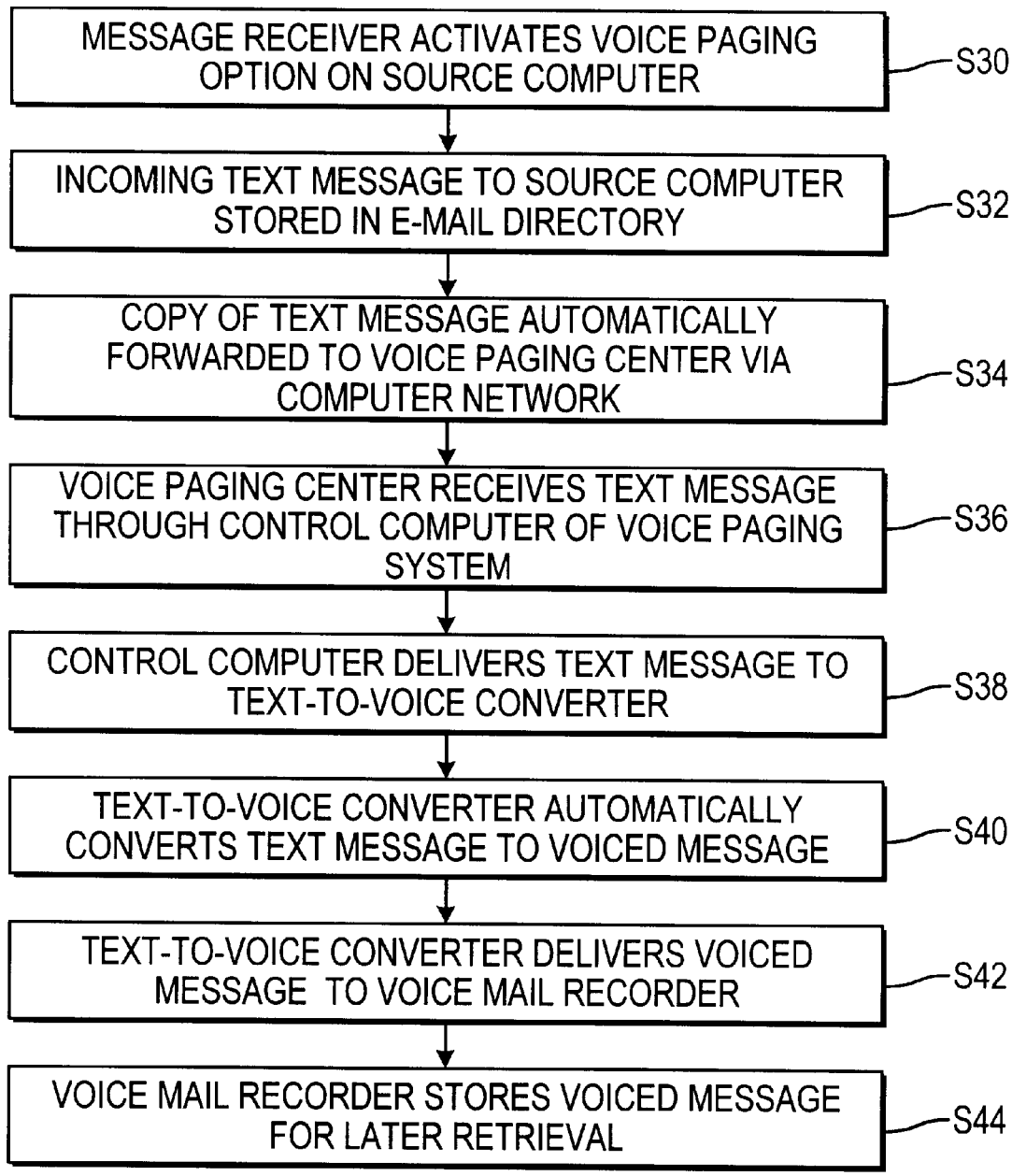
FIG. 3 shows a flow chart of a voice paging operation according to a second embodiment of the present invention.

According to a second embodiment of the present invention, represented by the flow chart of FIG. 3 and relating to the system of FIG. 1, a message receiver at step S30 sets up a source computer 2 to have a voice paging option such that when the voice paging option is activated all incoming e-mail messages to the source computer 2 are stored at step S32 in an e-mail directory within the source computer 2 and copies of the e-mail messages are forwarded at step S34 to a voice paging center via a computer network 8. A voice paging system 4 of the voice paging center receives at step S36 the text message from the computer network 8 through a control computer 6 of the voice paging system 4. The control computer 6 delivers at step S38 the text message to a text-to-voice converter 10 of the voice paging system 4, which automatically converts at step 40 the text message to a voiced message and delivers at step S42 the voiced message a voice mail recorder 16. The voice mail recorder 16 stores at step S44 the voiced message for later retrieval by the message receiver.

Figure 4:
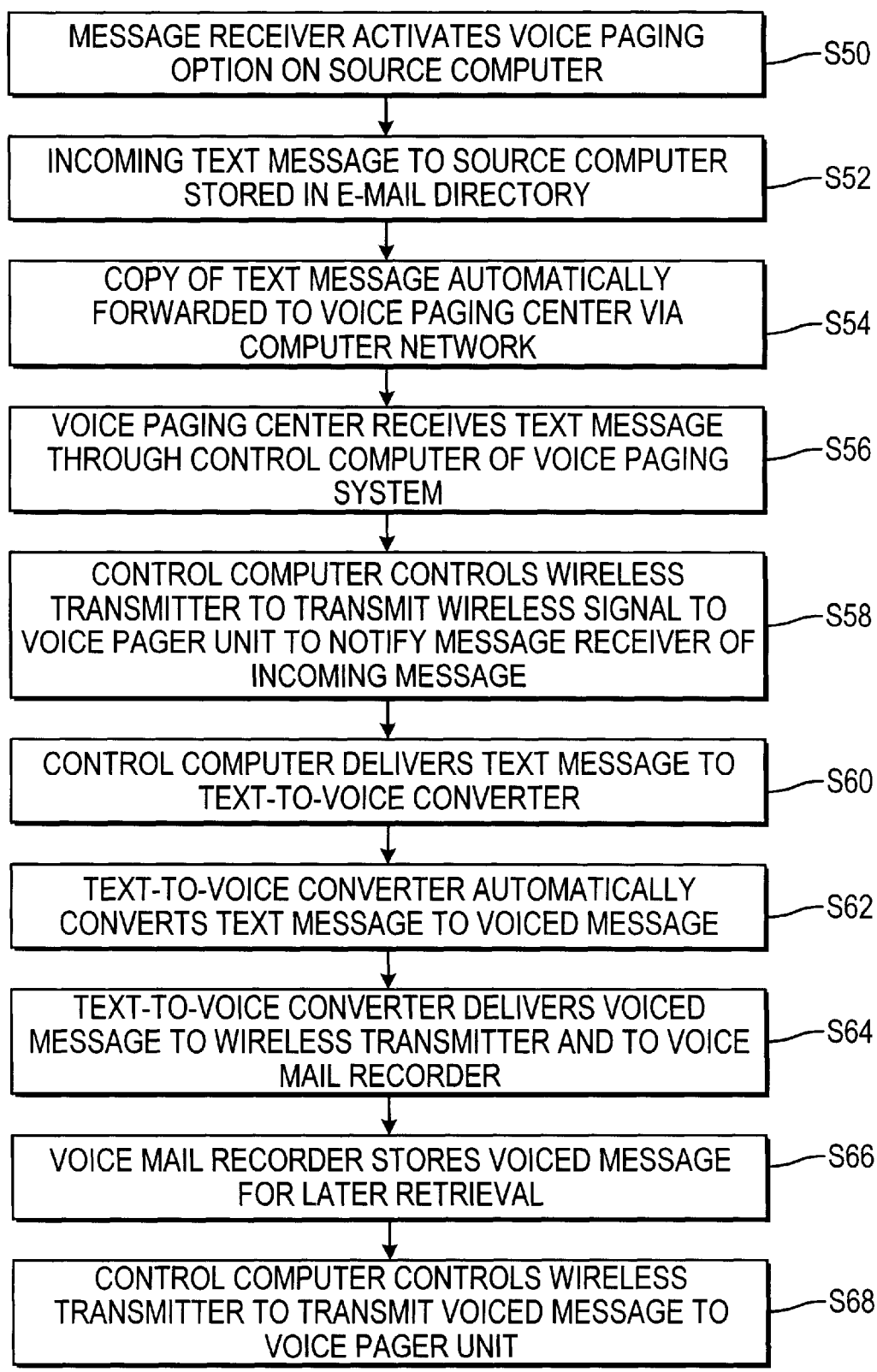
FIG. 4 shows a flow chart of a voice paging operation according to a third embodiment of the present invention.

According to a third embodiment of the present invention, represented by the flow chart of FIG. 4 and relating to the system of FIG. 1, a message receiver at step S50 sets up a source computer 2 to have a voice paging option such that when the voice paging option is activated all incoming e-mail messages to the source computer 2 are stored at step 52 in an e-mail directory within the source computer 2 and copies of the e-mail messages are forwarded at step S54 to a voice paging center via a computer network 8. A voice paging system 4 of the voice paging center receives at step S56 the text message from the computer network 8 through a control computer 6 of the voice paging system 4. The control computer 6 then controls at step S58 a wireless transmitter 12 to transmit in a wireless manner a signal to the message receiver's voice pager unit 14 to notify the message receiver of an incoming message. The control computer 6 also delivers at step S60 the text message to a text-to-voice converter 10 of the voice paging system 4. The text-to-voice converter 10 automatically converts at step S62 the text message to a voiced message and delivers at step S64 the voiced message to the wireless transmitter 12 and to a voice mail recorder 16 at the voice mail recorder address. The voice mail recorder 16 stores at step S66 the voiced message for later retrieval by the message receiver. The control computer 6 then controls at step S68 the wireless transmitter 12 to transmit in a wireless manner the voiced message to the voice pager unit 14.

The embodiments described above are illustrative examples of the present invention and it should not be construed that the present invention is limited to these particular embodiments. Various changes and modifications may be effected by one skilled in the art without departing from the spirit or scope of the invention as defined in the appended claims. For example, by using an electronic hand-writing recognition device, handwritten messages can be interpreted and converted to text messages. The text messages can then be converted to voiced messages which are transmitted to voice pager units. Also, by using a computer scanning device, faxed text messages can be scanned into a computer and using an appropriate electronic text interpreter the scanned messages can be interpreted as text messages and then converted to voiced messages which are transmitted to voice pager units. In addition, the present invention may be particularly relevant to voice paging systems for blind users, where text documents as well as e-mail messages can easily be converted to voiced messages and broadcast on a voice pager unit.

What is claimed is:

1. A voice paging system comprising:
    a control computer located at a voice paging service center for receiving a text message, a destination address and a voice mail recorder address transmitted through a computer network;
    a wireless transmitter located at the voice paging service center and controlled by the control computer;
    a voice mail recorder;
    a text-to-voice converter located at the voice paging service center and controlled by the control computer for receiving the text message from the control computer and for converting the text message to a voice message, wherein the text-to-voice converter automatically sends the voice message to the wireless transmitter for transmitting the voice message in a wireless manner in accordance with the destination address and to the voice mail recorder in accordance with the voice mail recorder address for recording the voice message for later retrieval; and
    a voice pager unit having the destination address for receiving the voice message transmitted in the wireless manner and producing the voice message for listening by a user thereof, wherein the control computer controls the text-to-voice converter to deliver the voice message only to the voice mail recorder in accordance with the voice mail recorder address and controls the wireless transmitter to transmit in a wireless manner an alerting signal to the voice pager unit having the destination address to indicate that the voice message has been recorded.

2. A voice paging system according to claim 1, wherein the computer network is a local area network.

3. A voice paging system according to claim 1, wherein the computer network is an external network.

4. A voice paging system according to claim 1, further comprising a source computer for receiving an electronic mail (e-mail) message as a text message and automatically forwarding a copy of the text message to the control computer through the computer network.

5. A voice paging system comprising:

a source computer for generating an electronic mail (e-mail) message as a text message, a destination address and a voice mail recorder address and automatically forwarding a copy of the text message, destination address and voice mail recorder address through a computer network;

a control computer located at a voice paging service center for receiving the text message transmitted through the computer network;

a voice mail recorder;

a wireless transmitter located at the voice paging service center and controlled by the control computer for transmitting a notification signal in a wireless manner to the destination address selected by the source computer;

a text-to-voice converter located at the voice paging service center and controlled by the control computer for receiving the text message from the control computer and for converting the text message to a voice message, wherein the text-to-voice converter automatically sends the voice message to the wireless transmitter for transmitting the voice message in a wireless manner in accordance with the destination address and to the voice mail recorder for recording the voice message in accordance with the voice mail recorder address for later retrieval; and a voice pager unit having the destination address for receiving the notification signal transmitted in the wireless manner and broadcasting the notification signal to a user of the voice pager unit to indicate that the voice mail recorder has recorded therein the voice message ready for retrieval, wherein the control computer controls the text-to-voice converter and the wireless transmitter to automatically transmit the voice message to the voice pager unit having the destination address upon conversion of the text message and to automatically record the voice message in accordance with the voice mail recorder address in the voice mail recorder.

6. A voice paging method comprising the steps of:

generating a text message, destination address and a voice mail recorder address using a source computer;

receiving the text message, destination address and the voice mail recorder address transmitted through a computer network to a voice paging service center;

converting the received text message to a voice message using a text-to-voice converter located at the voice paging service center and controlled by a control computer;

transmitting an alerting signal using a wireless transmitter at the voice paging service center to a voice pager unit having the destination address to indicate that the voice message is about to be transmitted;

transmitting the voice message automatically to the voice pager unit having the destination address using the wireless transmitter at the voice paging service center and controlled by the control computer; and recording the voice message on a voice mail recorder in accordance with the voice mail recorder address for later retrieval.

* * * * *